United States Patent
Yagur et al.

(10) Patent No.: US 9,937,603 B2
(45) Date of Patent: Apr. 10, 2018

(54) METHOD AND APPARATUS FOR COUPLING TWO WHEELED VEHICLES

(71) Applicants: Ron Yagur, Lake Mary, FL (US); Patrick Pollitt, Orlando, FL (US)

(72) Inventors: Ron Yagur, Lake Mary, FL (US); Patrick Pollitt, Orlando, FL (US)

( * ) Notice: Subject to any disclaimer, the term of this patent is extended or adjusted under 35 U.S.C. 154(b) by 0 days.

(21) Appl. No.: 15/359,670

(22) Filed: Nov. 23, 2016

(65) Prior Publication Data

US 2017/0197291 A1    Jul. 13, 2017

Related U.S. Application Data

(60) Provisional application No. 62/232,251, filed on Sep. 24, 2015.

(51) Int. Cl.

| B24B 55/10 | (2006.01) |
|---|---|
| B60D 3/00 | (2006.01) |
| B62B 3/14 | (2006.01) |
| A47L 9/10 | (2006.01) |
| A47L 7/00 | (2006.01) |
| B24B 7/18 | (2006.01) |

(52) U.S. Cl.
CPC ........... B24B 55/10 (2013.01); A47L 7/0095 (2013.01); A47L 9/104 (2013.01); B24B 7/18 (2013.01); B60D 3/00 (2013.01); B62B 3/1404 (2013.01)

(58) Field of Classification Search
CPC .......... B60D 3/00; B60D 1/00; B60D 53/061; B60D 53/0828; B24B 55/10
See application file for complete search history.

(56) References Cited

U.S. PATENT DOCUMENTS

| 1,574,468 A | | 2/1926 | Clement |
|---|---|---|---|
| 2,001,451 A | | 5/1935 | Boehler |
| 2,610,351 A | | 9/1952 | Howard |
| 2,772,893 A | | 12/1956 | Wettstein |
| 3,209,385 A | | 10/1965 | Bruck |
| 3,664,687 A | * | 5/1972 | Nutt .......... B60P 3/125 280/402 |
| 3,751,072 A | | 8/1973 | Williams |
| 4,679,978 A | * | 7/1987 | Holmes ........ B60P 3/125 414/563 |
| 4,711,461 A | | 12/1987 | Fromberg |
| 4,737,066 A | * | 4/1988 | Allison, Jr. ...... B60P 3/125 280/402 |

(Continued)

*Primary Examiner* — Hau V Phan
(74) *Attorney, Agent, or Firm* — John L. DeAngelis; Beusse Wolter Sanks & Maire

(57) ABSTRACT

A method and apparatus are provided for coupling a first and second wheeled vehicle. The apparatus includes a first area with a stop to engage an undersurface of the first wheeled vehicle and a second area with spaced apart openings to receive wheels of the second vehicle. The apparatus also includes a hook member positioned between the first and second areas and including surfaces to engage a perimeter of the frame of the first wheeled vehicle. The method includes engaging a perimeter of the frame of the first wheeled vehicle with the hook member. The method further includes rotating the stop about an engagement point between the hook member and the frame of the first wheeled vehicle until the stop engages an undersurface of the frame. The method further includes positioning a pair of wheels of the second vehicle in the spaced apart openings.

14 Claims, 17 Drawing Sheets

(56) References Cited

U.S. PATENT DOCUMENTS

| | | | | |
|---|---|---|---|---|
| 4,797,058 A * | 1/1989 | Bilas | ................. | B60P 3/125 |
| | | | | 280/402 |
| 5,099,545 A | 3/1992 | Krasznai | | |
| 5,163,803 A * | 11/1992 | Marola | ............. | B62D 53/0828 |
| | | | | 280/402 |
| 5,280,666 A | 1/1994 | Wood | | |
| 5,401,050 A * | 3/1995 | Baker | ................. | B62D 53/061 |
| | | | | 280/656 |
| 5,540,540 A * | 7/1996 | Peterson | ............... | B60P 3/127 |
| | | | | 280/402 |
| 5,984,616 A * | 11/1999 | Youmans | ............... | B60P 3/125 |
| | | | | 280/402 |
| 6,692,218 B2 * | 2/2004 | Grile | ................. | B60P 3/125 |
| | | | | 414/426 |
| 6,942,443 B2 * | 9/2005 | Shubert | ................. | B60P 3/125 |
| | | | | 280/502 |
| 7,278,647 B1 * | 10/2007 | Keenan | ................. | B60S 13/00 |
| | | | | 280/79.11 |
| 7,308,729 B2 | 12/2007 | Seasholtz | | |
| 7,789,411 B2 * | 9/2010 | Schuettenberg | ......... | B60D 1/00 |
| | | | | 280/400 |
| 8,622,413 B2 * | 1/2014 | Schuettenberg | ......... | B60D 1/00 |
| | | | | 280/402 |
| 2004/0036255 A1 * | 2/2004 | Orlando | ................. | B60P 3/07 |
| | | | | 280/402 |

\* cited by examiner

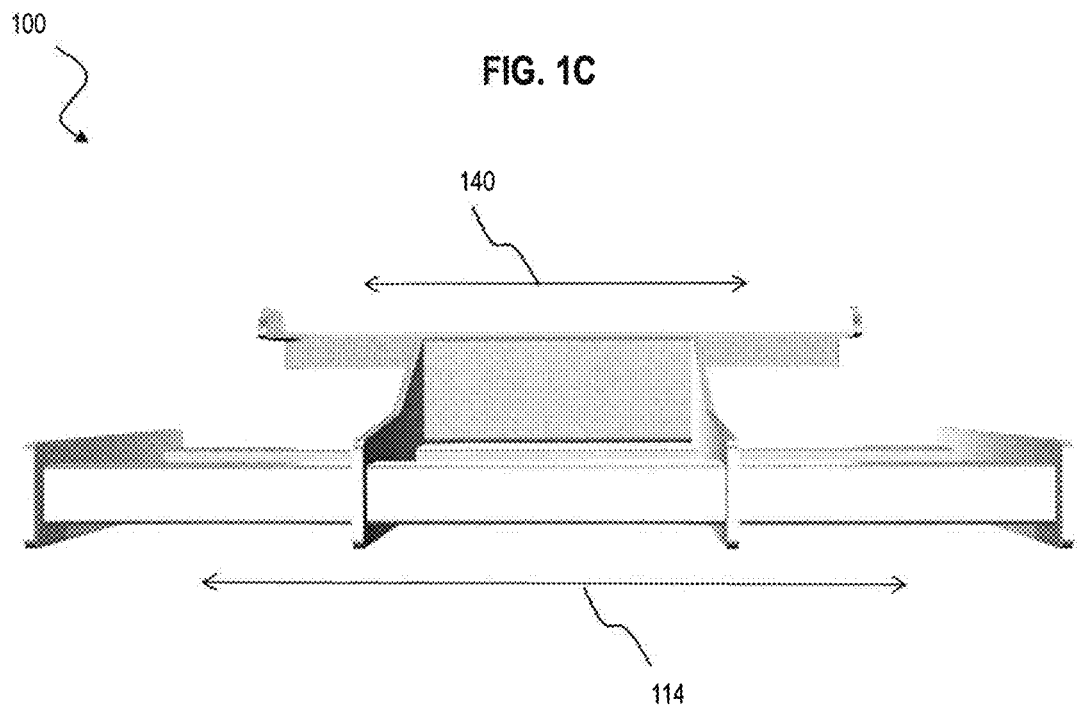
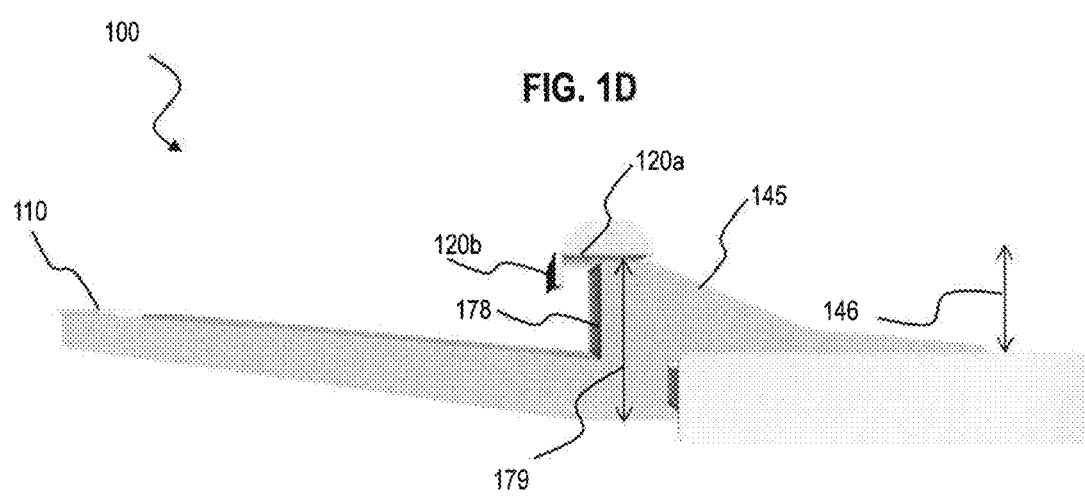

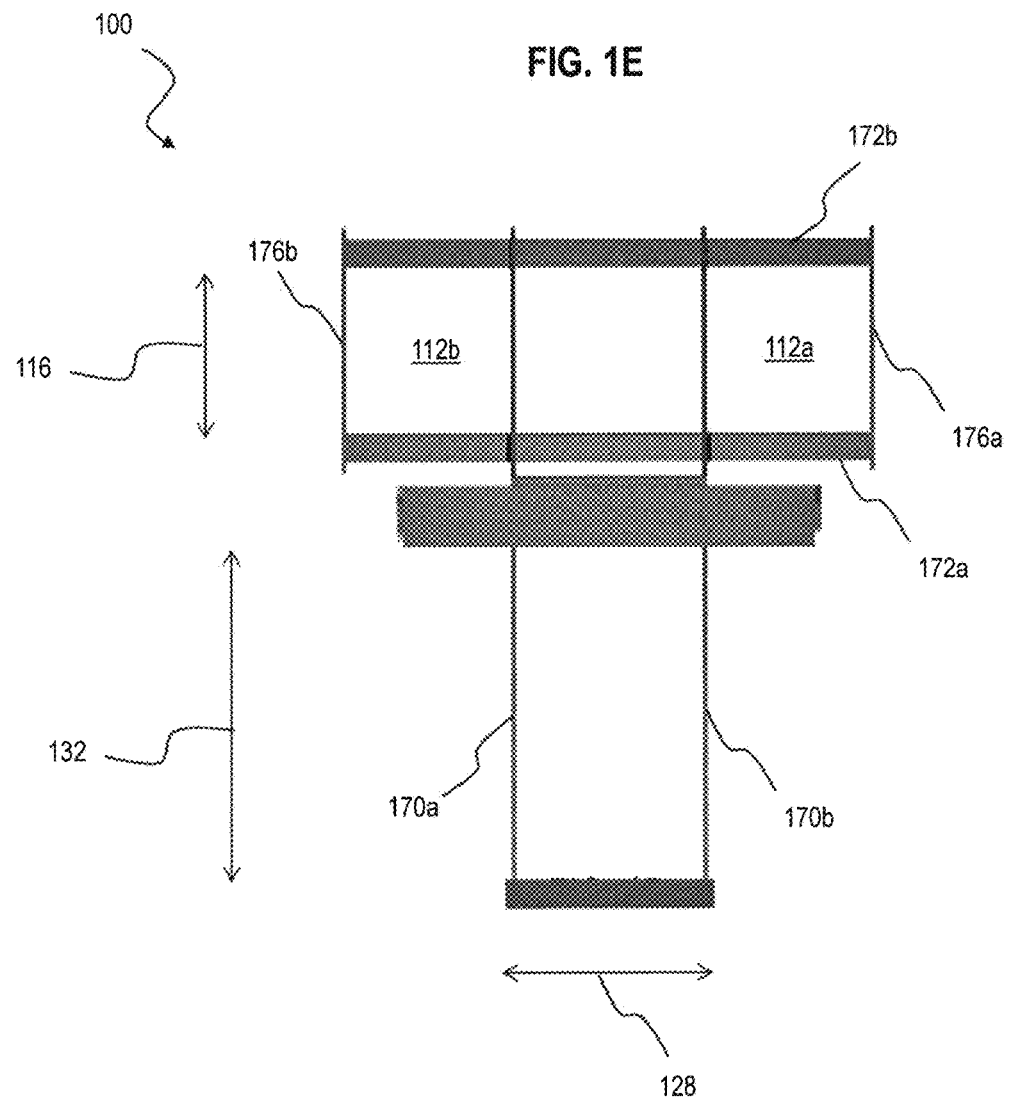

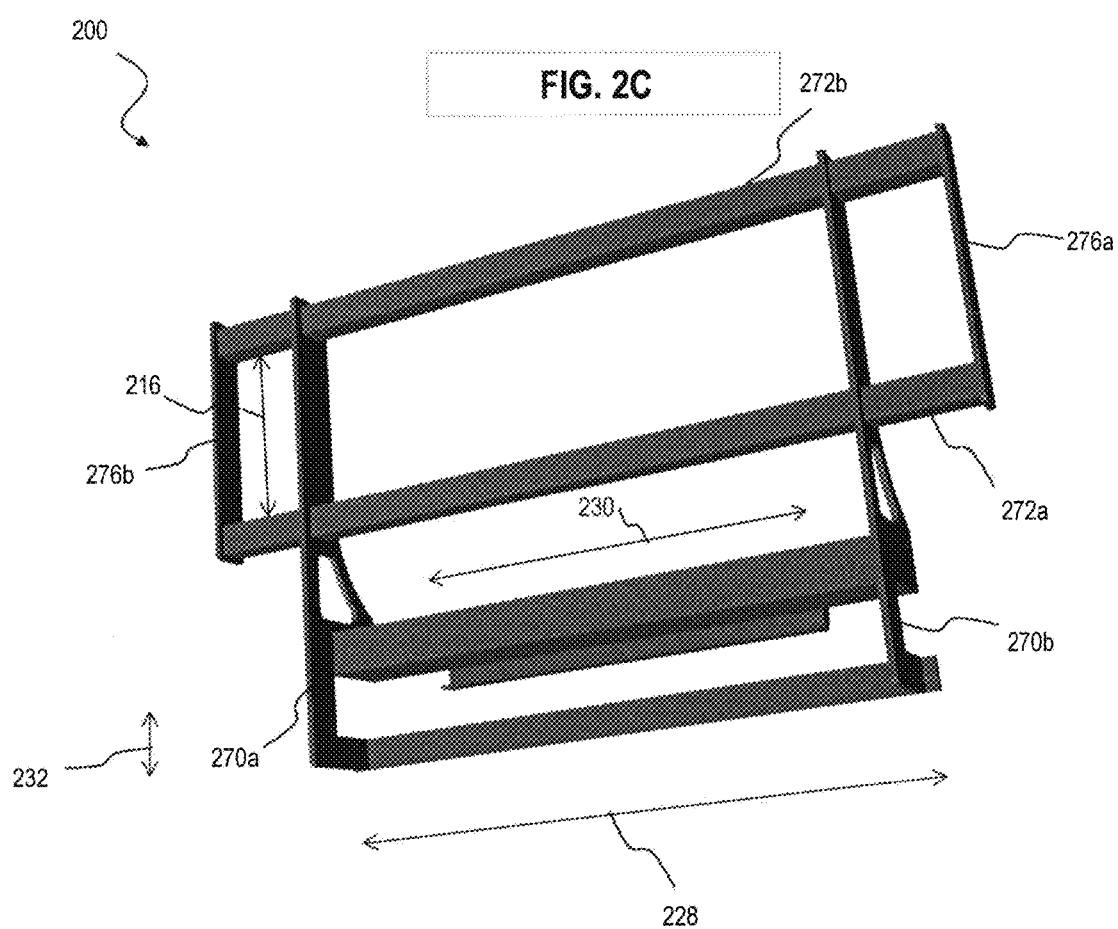

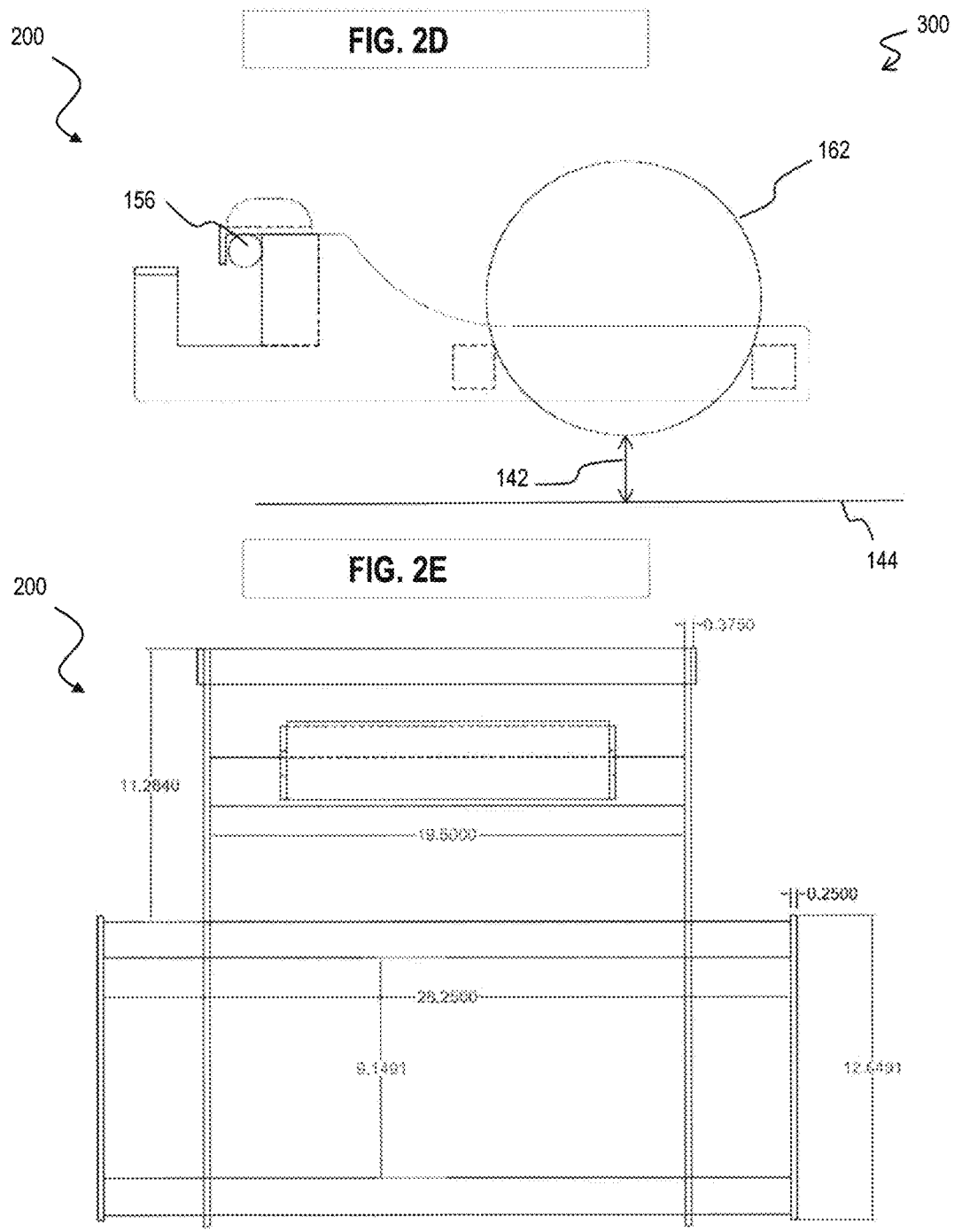

METHOD AND APPARATUS FOR COUPLING TWO WHEELED VEHICLES

CROSS-REFERENCE TO RELATED APPLICATIONS

This application claims benefit of Provisional Appln. 62/232,251, filed Sep. 24, 2015, the entire contents of which are hereby incorporated by reference as if fully set forth herein, under 35 U.S.C. § 119(e).

BACKGROUND

Concrete grinding involves the use of a grinder that generates dust particles. Filtration equipment is connected to the grinder to capture the dust particles and includes a pre-separator to capture 80-90% of larger sized particles and a high-efficiency particulate arrestance (HEPA) vacuum or extractor to capture the remaining particles. A first duct is connected from the grinder outlet to the pre-separator inlet and a second duct is connected from the pre-separator outlet to the vacuum inlet. This arrangement ensures that the pre-separator captures 80-90% of the larger sized particles upstream of the vacuum. One advantage of this arrangement is extending the lifetime of the vacuum filter, since the larger sized particles are filtered upstream of the vacuum.

SUMMARY

In a first set of embodiments, an apparatus is provided for coupling a first wheeled vehicle to a second wheeled vehicle. The apparatus includes a first area with a stop configured to engage an undersurface of a frame of the first wheeled vehicle. The apparatus further includes a second area with a pair of spaced apart openings having a separation and a dimension sized to receive a pair of wheels of the second wheeled vehicle. The apparatus further includes a hook member positioned between the first area and the second area and including a plurality of surfaces configured to engage a perimeter of the frame of the first wheeled vehicle.

In a second set of embodiments, an apparatus is provided for coupling a first wheeled vehicle to a second wheeled vehicle. The apparatus includes a first pair of members that are spaced apart and parallel to each other. The apparatus further includes a second pair of members that are spaced apart and parallel to each other. The second pair of members intersect the first pair of members and are oriented approximately orthogonal to the first pair of members. The apparatus further includes a stop that connects the first pair of members to each other at one end of the first pair of members. The apparatus further includes a pair of links that connect the second pair of members to each other at respective ends of the second pair of members. The apparatus further includes a hook member connected to the first pair of members between opposing ends of the first pair of members, where the hook member includes a plurality of surfaces configured to engage a perimeter of a frame of the first wheeled vehicle. The apparatus further includes a pair of spaced apart openings defined by the pair of links, the second pair of members and the first pair of members, where the spaced apart openings are sized to receive a pair of wheels of the second wheeled vehicle. The stop is configured to engage an undersurface of the frame of the first wheeled vehicle.

In a third set of embodiments, a method is provided for coupling a first wheeled vehicle to a second wheeled vehicle. The method includes engaging a perimeter of a frame of the first wheeled vehicle with a hook member of a coupler. The method further includes rotating a stop of the coupler about an engagement point between the hook member and the frame of the first wheeled vehicle until the stop engages an undersurface of the frame of the first wheeled vehicle. The method further includes positioning a pair of wheels of the second vehicle in a respective pair of spaced apart openings of the coupler.

Still other aspects, features, and advantages are readily apparent from the following detailed description, simply by illustrating a number of particular embodiments and implementations, including the best mode contemplated for carrying out the invention. Other embodiments are also capable of other and different features and advantages, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

Embodiments are illustrated by way of example, and not by way of limitation, in the figures of the accompanying drawings in which like reference numerals refer to similar elements and in which:

FIG. 1C is a rear view that illustrates an example of the apparatus of FIG. 1A, according to one embodiment;

FIG. 1D is a side view that illustrates an example of the apparatus of FIG. 1A, according to one embodiment;

FIG. 1E is a top view that illustrates an example of the apparatus of FIG. 1A, according to one embodiment;

FIG. 2C is a bottom perspective view that illustrates an example of the apparatus of FIG. 2A, according to one embodiment;

FIG. 2D is a sectional view that illustrates an example of the apparatus of FIG. 2A connected to the wheeled vehicles, according to one embodiment;

FIG. 2E is a sectional view that illustrates an example of the apparatus of FIG. 2A, according to one embodiment;

DETAILED DESCRIPTION

Figure 1A:
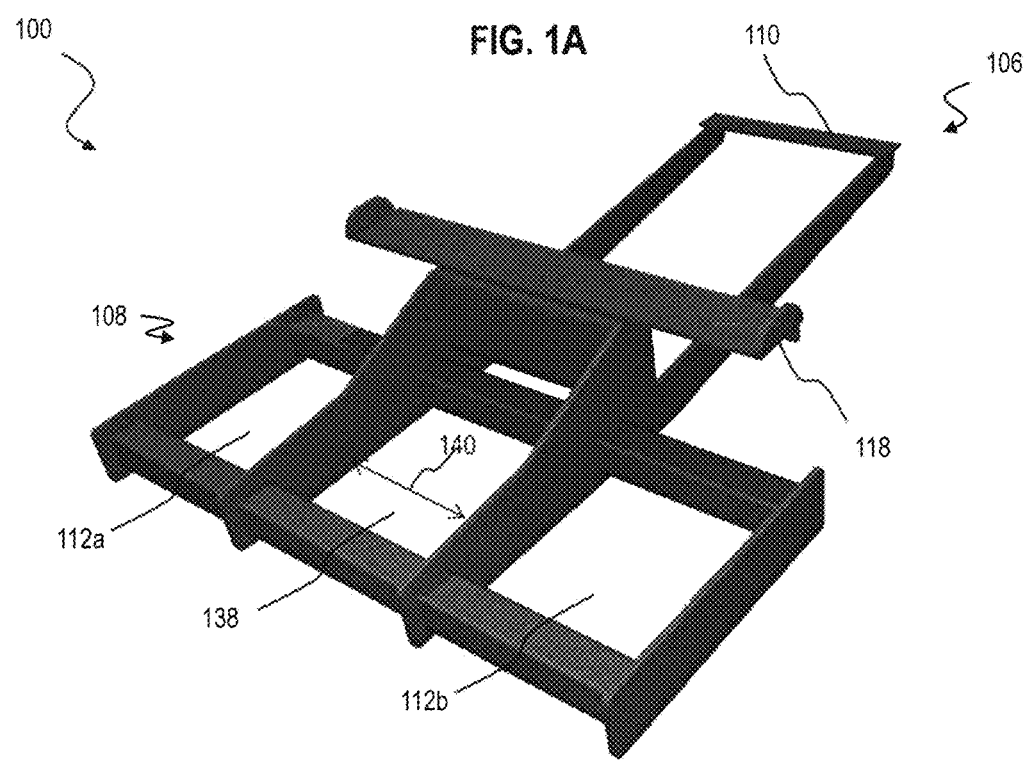
FIG. 1A is a perspective view that illustrates an example of an apparatus for coupling a first wheeled vehicle to a second wheeled vehicle, according to one embodiment.

The inventors of the present invention recognized that the conventional arrangement of using the concrete grinder, pre-separator and vacuum had several drawbacks. Typically, two workers combine their efforts, where one worker pushes the grinder while the other worker pushes the vacuum. Once a given area is sufficiently grinded, the two workers must re-locate the grinder, pre-separator and vacuum to a new location. To perform this re-location, the worker pushing the grinder temporarily shuts down the grinder and assists the other worker in relocating the pre-separator and the vacuum. One worker pushes the pre-separator to the new location while the other worker pushes the vacuum to the new location. A worker then turns back on the grinder and commences to grind the surface at the new location. The inventors recognized that if one worker could simultaneously move the pre-separator and vacuum to the new location, then the other worker could stay on the grinder and thus would not need to shut down the grinder, thereby increasing work efficiency. The inventors developed a coupler specifically designed to connect the pre-separator to the vacuum so that one worker can easily move the pre-separator and vacuum simultaneously.

Due to the labor intensive process of constantly relocating the pre-separator and vacuum discussed above, the inventors of the present invention recognized that workers in the field seldom use the pre-separator and thus typically only use the grinder and vacuum. Consequently, since the pre-separator is frequently not employed to filter 80-90% of the large dust particles, these large particles enter the vacuum and result in the vacuum filter requiring replacement 8-9 times more frequently than if the pre-separator was used. Since vacuum filters cost over $900 each, this substantially increases operating costs over time. The inventors of the present invention recognized that if the relocation process of the pre-separator and vacuum was simplified, where the pre-separator and vacuum could be coupled together in an easy manner, workers would use the pre-separator and thus operators of the vacuum would not have to pay for the excessive vacuum filter replacement.

The inventors of the present invention also recognized that sales volumes of pre-separators are hindered by the above labor intensive process and resulting disincentive of workers to use the pre-separator. The inventors of the present invention recognized that if a coupler was developed to simplify the relocation process above, then workers would use the pre-separator and resulting sales volumes of pre-separators would increase.

Notwithstanding that the numerical ranges and parameters setting forth the broad scope are approximations, the numerical values set forth in specific non-limiting examples are reported as precisely as possible. Any numerical value, however, inherently contains certain errors necessarily resulting from the standard deviation found in their respective testing measurements at the time of this writing. Furthermore, unless otherwise clear from the context, a numerical value presented herein has an implied precision given by the least significant digit. Thus a value 1.1 implies a value from 1.05 to 1.15 . The term "about" is used to indicate a broader range centered on the given value, and unless otherwise clear from the context implies a broader range around the least significant digit, such as "about 1.1" implies a range from 1.0 to 1.2 . If the least significant digit is unclear, then the term "about" implies a factor of two, e.g., "about X" implies a value in the range from 0.5 X to 2 X, for example, about 100 implies a value in a range from 50 to 200 . Moreover, all ranges disclosed herein are to be understood to encompass any and all sub-ranges subsumed therein. For example, a range of "less than 10" can include any and ail sub-ranges between (and including) the minimum value of zero and the maximum value of 10, that is, any and all sub-ranges having a minimum value of equal to or greater than zero and a maximum value of equal to or less than 10, e.g., 1 to 4.

FIGS. 1A-1E are views that illustrates an example of a coupler or apparatus 100 for coupling a first wheeled vehicle to a second wheeled vehicle, according to one embodiment. In an example embodiment, the first wheeled vehicle is a vacuum and the second wheeled vehicle is a pre-separator. In an example embodiment, the vacuum and pre-separator are used for dust collection during concrete grinding, such as vacuums and pre-separators produced by Pullman Ermator®, Tampa, Fla. In one example embodiment, the pre-separator is an Ermator® C5500 . In another example embodiment, the pre-separator is an Ermator® C3000 . In another example embodiment, the pre-separator is an Ermator® C1300. In one example embodiment, the vacuums is an Ermator® T7500, in another example embodiment, the vacuum is an Ermator® T8600 . in one example embodiment, the vacuum is an Ermator® T4000 . In another example embodiment, the vacuum is an Ermator® S36 . In another example embodiment, the vacuum is an Ermator® S26 . However, the apparatus 100 is not limited to coupling any specific types of wheeled vehicles together.

The apparatus 100 includes a first area 106 with a stop 110 configured to engage an undersurface of a frame of the first wheeled vehicle. The apparatus 100 also includes a second area 108 including a pair of spaced apart openings 112*a*, 112*b*, The spaced apart openings 112*a*, 112*b* have a separation 114 (FIG. 1C) and a dimension 116 (FIG. 1E) sized to receive a pair of wheels of the second wheeled vehicle. In an example embodiment, the dimension 116 is about 6.5 inches or within a range of 5-8 inches. However, the dimension 116 is not limited to any particular value and is based on the size and dimension of the wheels 162 of the second vehicle. In another example embodiment, the separation 114 is about 23.2 inches or within a range of 20-2.5 inches. However, the separation 114 is not limited to any particular value and is based on a separation of the wheels of the second vehicle.

The apparatus 100 also includes a hook member 118 positioned between the first area 106 and the second area 108. The hook member 118 includes a plurality of surfaces configured to engage a perimeter of the frame of the first wheeled vehicle. In some embodiments, the hook member 118 is an L-shaped member (FIG. 1D) including a horizontal surface 120*a* and a vertical surface 120*b* that are orthogonal to each other. In some embodiments, the stop 110 (FIG. 1D) is a flat surface that is oriented parallel to the horizontal surface 120*a* of the hook member 118.

Figure 1B:
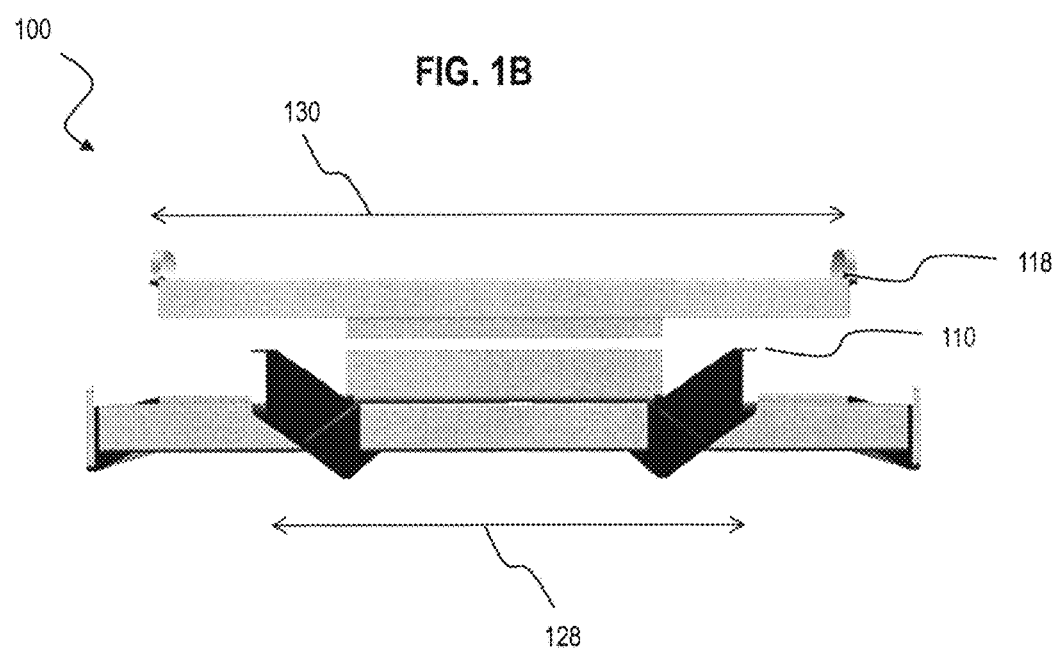
FIG. 1B is a front view that illustrates an example of the apparatus of FIG. 1A, according to one embodiment.

As shown in FIG. 1B, the stop 110 has a length 128 and the hook member 118 has a length 130. In the illustrated embodiment of FIG. 1B, the length 128 of the stop 110 is less than a length 130 of the hook member 130. Additionally, as shown in FIG. 1E, the length 128 of the stop 110 is less than a separation 132 between the stop 110 and the hook member 118. The sizing of the length 128 of the stop 110 is further mentioned below during the discussion of FIGS. 3A-3H. In an example embodiment, the length 128 of the stop 110 is about 8.2 inches or within a range of 7-9 inches. However, the length 128 is not limited to any particular value. In another example embodiment, the separation 132 is about 18.5 inches or within a range of 16-20 inches. However, the separation 132 is not limited to any particular value.

As shown in FIG. 1A, the second area 108 includes an intermediate opening 138 positioned between the spaced apart openings 112a, 112b. In some embodiments, the length 128 of the stop 110 is based on the width 140 of the intermediate opening 138. In an example embodiment, the length 128 of the stop 110 is approximately equal to the width 140 of the intermediate opening 138.

As shown in FIG. 1E, in some embodiments, the apparatus 100 includes a first pair of members 170a, 170b that are spaced apart and are parallel to each other. The first pair of member 170a, 170b extend horn the first area 106 to the second area 108. Additionally, in some embodiments, the apparatus 100 includes a second pair of members 172a, 172b that are spaced apart and are parallel to each other. In some embodiments, the second pair of members 172a, 172b are oriented approximately orthogonal to the first pair of members 170a, 170b. in some embodiments, the second pair of members 172a, 172b intersect the first pair of members 170a, 170b. In some embodiments, the stop 110 connects the first pair of members 170a, 170b, to each other at one end of the first pair of members 170a, 170b in the first area 106. In one example embodiment, steel material is used to make the apparatus 100. However, the apparatus 100 is not limited to any specific type of material.

As further shown in FIG. 1E, in still other embodiments, the apparatus 100 includes a pair of links 176a, 176h that connect the second pair of members 172a, 172h to each other at respective ends of the second pair of members 172a, 172b in the second area 108. As depicted in FIG. 1E, the pair of spaced apart openings 112a, 172b are defined by the pair of links 176a, 176b, the second pair of members 172a, 172b and the first pair of members 170a, 170b. In some embodiments, a width of the spaced apart openings 112a, 112b is defined by a separation between the links 176a, 176b and the first pair of members 170a, 170b. In some embodiments, a length of the spaced apart openings 112a, 112b is defined by a separation of the second pair of members 172a, 172b.

As shown in FIG. 1D, the first pair of members 170a, 170b have a maximum height 179 at an intermediate portion 178 between the first area 106 and the second area 108. In some embodiments, the hook member 118 is mounted to the first pair of members 170a, 170b at the intermediate portion 178.

Figure 6A:
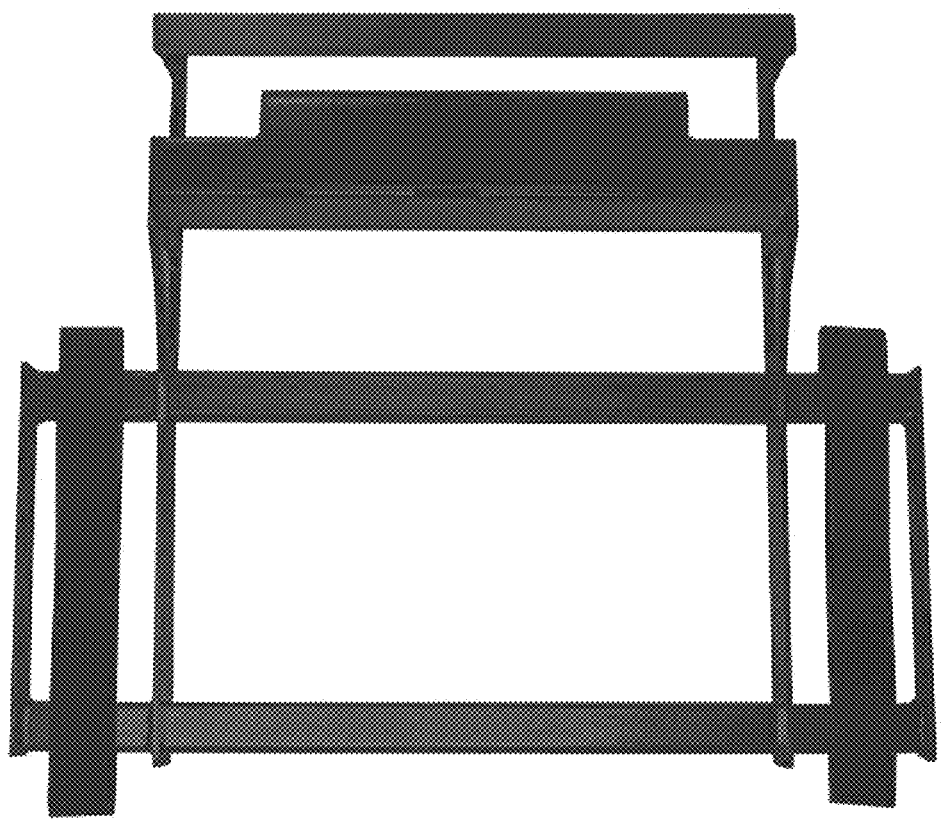
FIG. 6A is a top view that illustrates an example of the apparatus of FIG. 2A, according to one embodiment.
Figure 6B:
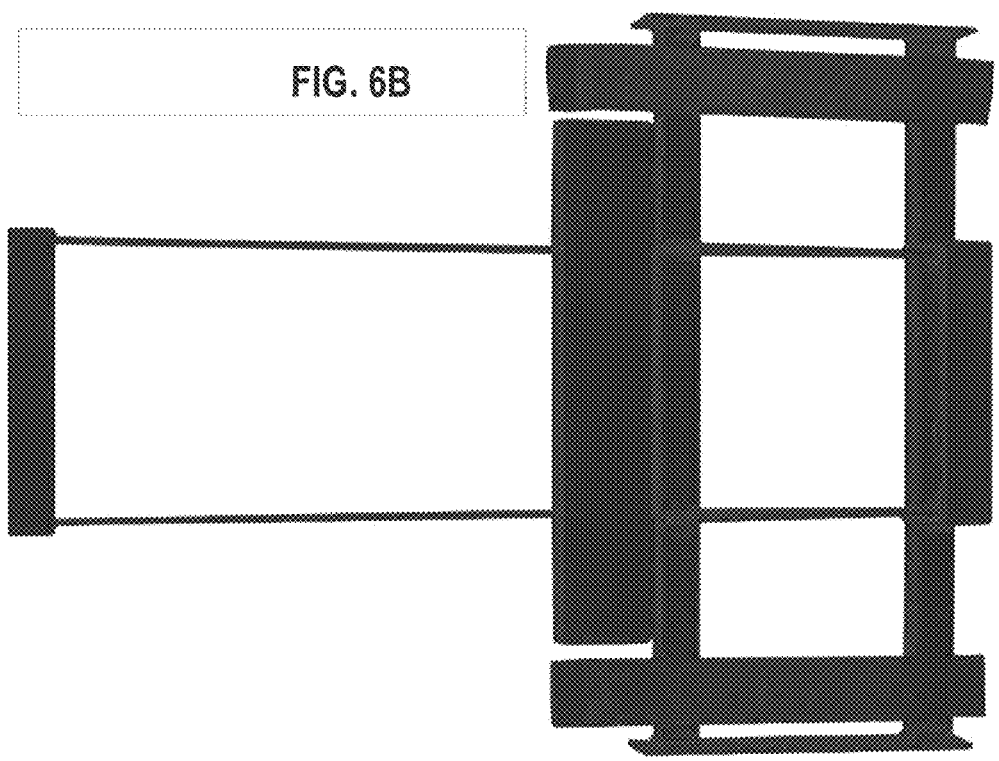
FIG. 6B is a top view that illustrates an example of the apparatus of FIG. 1A, according to one embodiment.
Figure 6C:
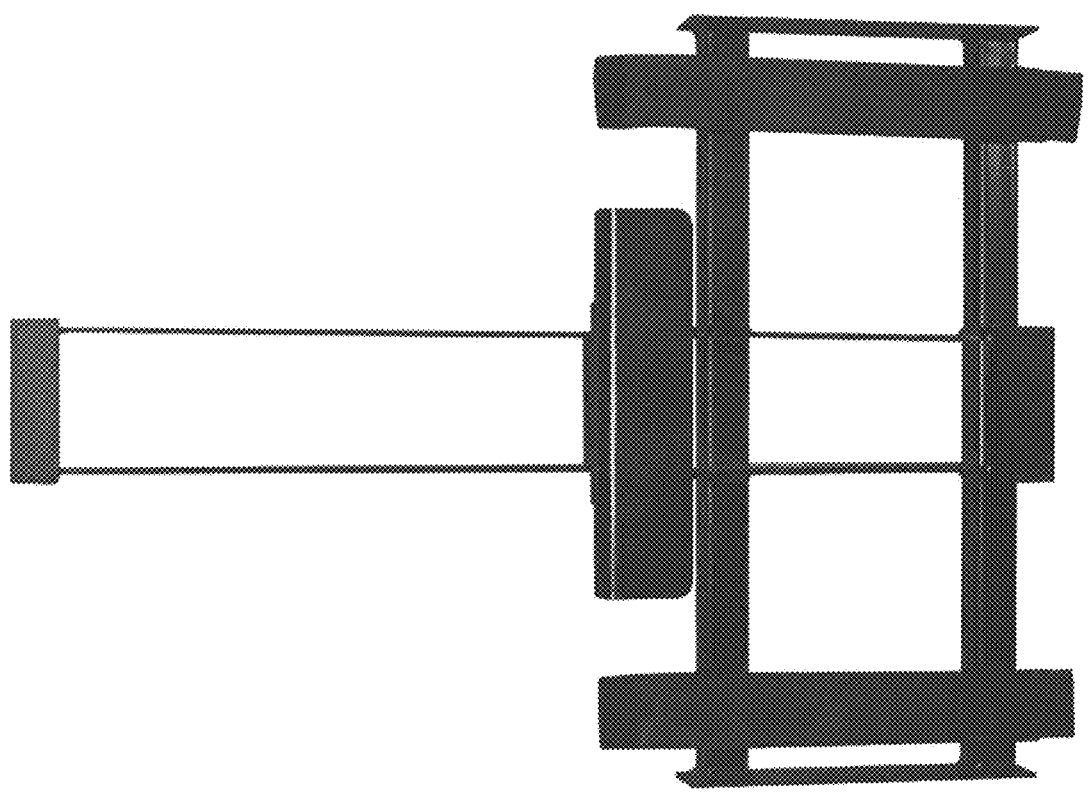
FIG. 6C is a top view that illustrates an example of an apparatus for coupling a first wheeled vehicle to a second wheeled vehicle, according to another embodiment.

As shown in FIG. 1D, the apparatus 100 includes a transition region 145 from a first height at the hook member 118 to a second height at the spaced apart openings 112, where the height difference 146 between the first and second height is depicted. In some embodiments, the transition region 145 is adjusted such that the height difference 146 provides a minimum clearance 142 (FIG. 2D) between a base of the wheels in the openings 112 and a ground surface 144. In an example embodiment, the height difference 146 is about 3 inches or within a range of 2-4 inches. However, the height difference 146 is not limited to any specific value and is sized based on the size and dimensions of the vehicles 150, 160. FIG. 6B is a top view that illustrates an example of the apparatus 100 of FIG. 1A, according to one embodiment. FIG. 6C is a top view that illustrates an example of an apparatus for coupling a first wheeled vehicle to a second wheeled vehicle, according to another embodiment. In an example embodiment, the apparatus 100 of FIG. 1A is used to couple an Ermator® S36 or T4000 vacuum (e.g. first vehicle 150) to an Ermator® C3000 pre-separator (i.e. second vehicle 160). In an example embodiment, the apparatus 100 of FIG. 6C is used to couple an Ermator® S26 vacuum (e.g. first vehicle 150) to an Ermator® C3000 or C1300 pre-separator (i.e. second vehicle 160).

FIGS. 2A-2E are views that illustrates an example of an apparatus 200 for coupling a first wheeled vehicle to a second wheeled vehicle, according to one embodiment. With the exception of the components of the apparatus 200 discussed herein, the components of the apparatus 200 are similar to the components of the apparatus 100 discussed above, with equivalent 100 notation and thus require no further discussion herein.

As depicted in FIG. 2C, the dimension 216 (i.e. length) of the opening 212a is adjusted within a range such that upon positioning the wheels 162 of the second vehicle in the opening 212a, a minimum clearance 142 (FIG. 2D) is achieved between a base of the wheel 162 and a ground surface 144. In an example embodiment, the minimum clearance 142 is about 2 inches or within a range of 1-3 inches. However, the minimum clearance 142 is not limited to any particular value.

Figure 2A:
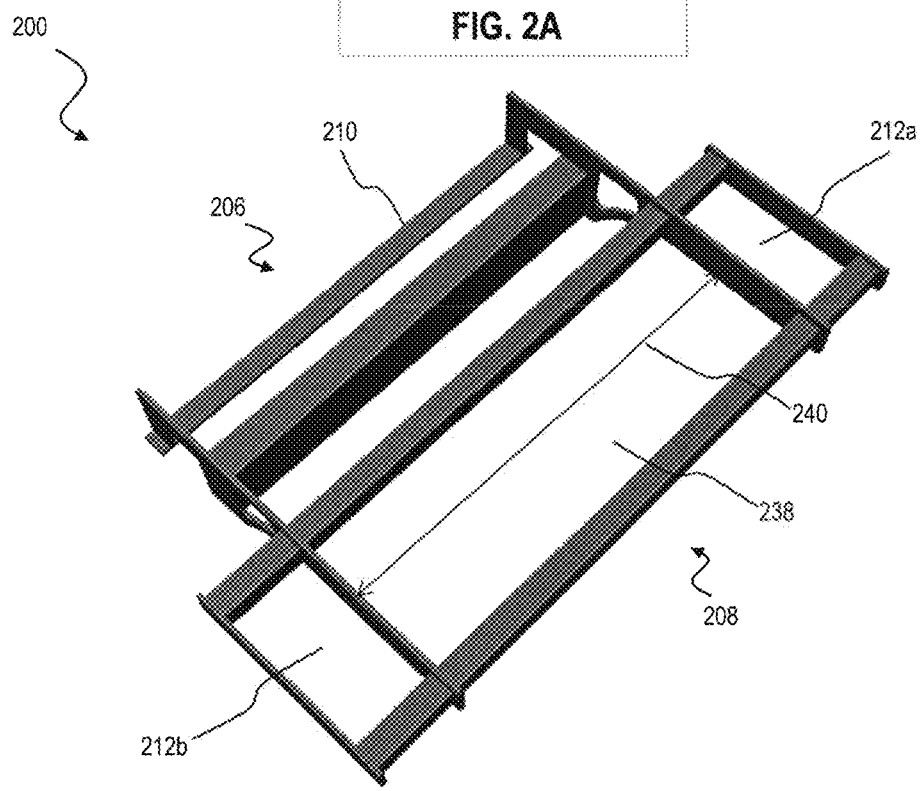
FIG. 2A is a bottom perspective view that illustrates an example of an apparatus for coupling a first wheeled vehicle to a second wheeled vehicle, according to one embodiment.
Figure 2B:
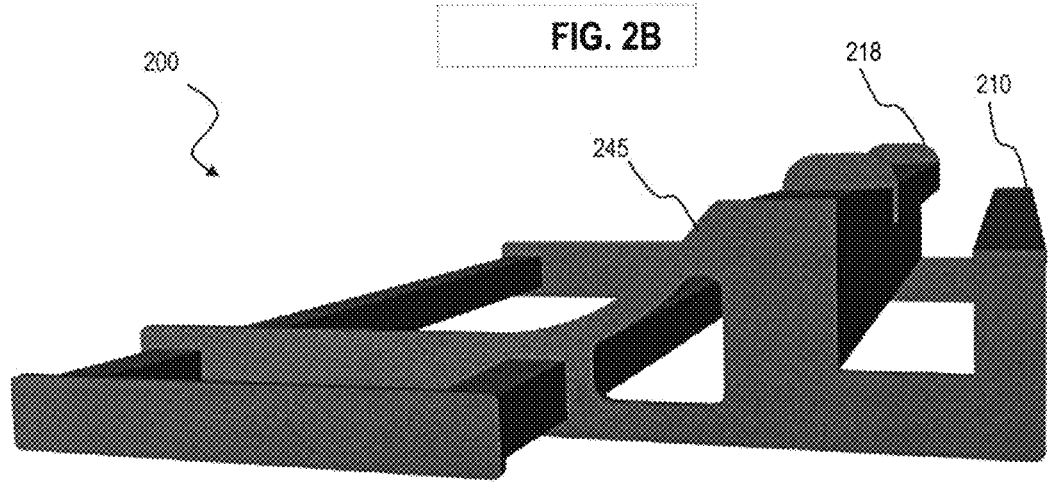
FIG. 2B is a side perspective view that illustrates an example of the apparatus of FIG. 2A, according to one embodiment.

As depicted in FIG. 2C, in some embodiments, a length 228 of the stop 210 is greater than a length 230 of the hook member 218. Additionally, as depicted in FIG. 2C, in some embodiments, the length 228 of the stop 210 is greater than a separation 232 between the stop 210 and the hook member 218. In another example embodiment, the length 228 is about 20 inches or within a range of 18-22 inches. However, the length 228 is not limited to any particular value. FIG. 6B is a top view that illustrates an example of the apparatus 200 of FIG. 2A, according to one embodiment. In an example embodiment, the apparatus 200 of FIG. 2A is used to couple an Ermator® T7500 or T8600 vacuum (e.g. first vehicle 150) to an Ermator® C5500 pre-separator (i.e. second vehicle 160).

Figure 3A:
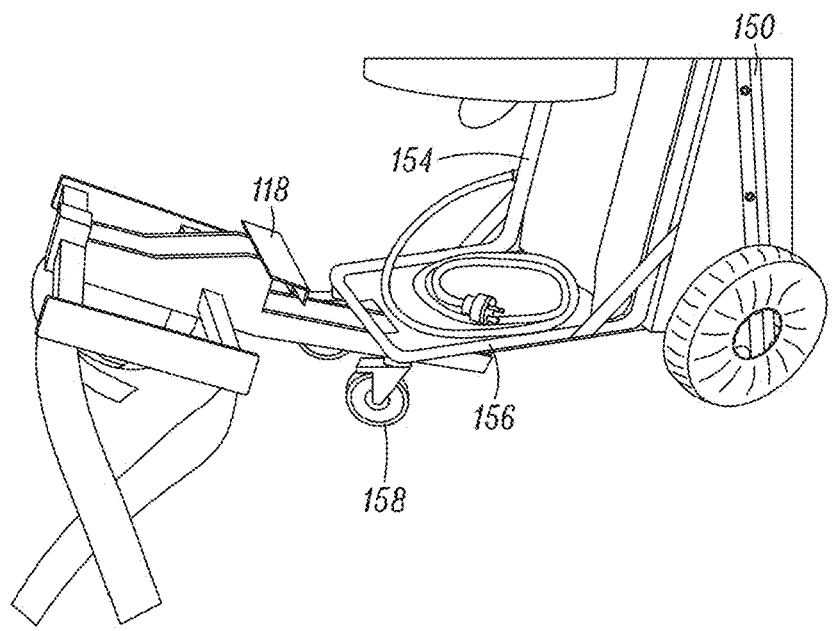
FIGS. 3A-3H are photographs that show various steps of coupling the wheeled vehicles using the apparatus of FIG. 1A, according to one embodiment.
Figure 3B:
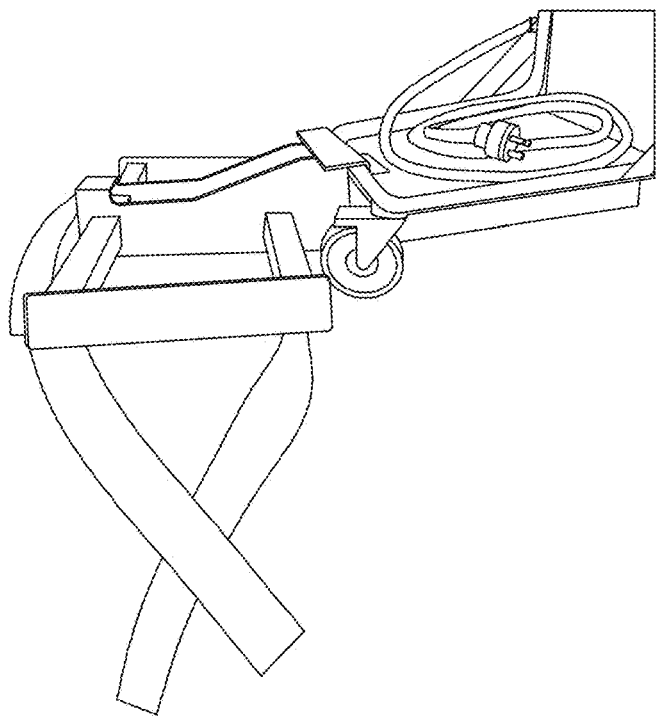

FIGS. 3A-3H are photographs that show various steps of coupling the wheeled vehicles using the apparatus 100 of FIG. 1A, according to one embodiment. As shown in FIG. 3A, in an initial step, the apparatus 100 is oriented at an angle relative to the first vehicle 150 and the stop 110 is inserted between wheels 158 of the first vehicle 150 frame that are positioned on an inside of the frame 154. The sizing of the length 128 of the stop 110 is provided so that the stop 110 can fit between the wheels 158 located on the inside of the vehicle frame 154. As shown in FIG. 3B, the hook member 118 engages the perimeter 156 of the frame 154 of the first vehicle 150. In some embodiments, the hook member 118 includes an extension (not shown) with a length that equals a length of a recess 157 (FIG. 3E) in the perimeter 156. The extension of the hook member 118 is secured within the recess 157.

Figure 3C:
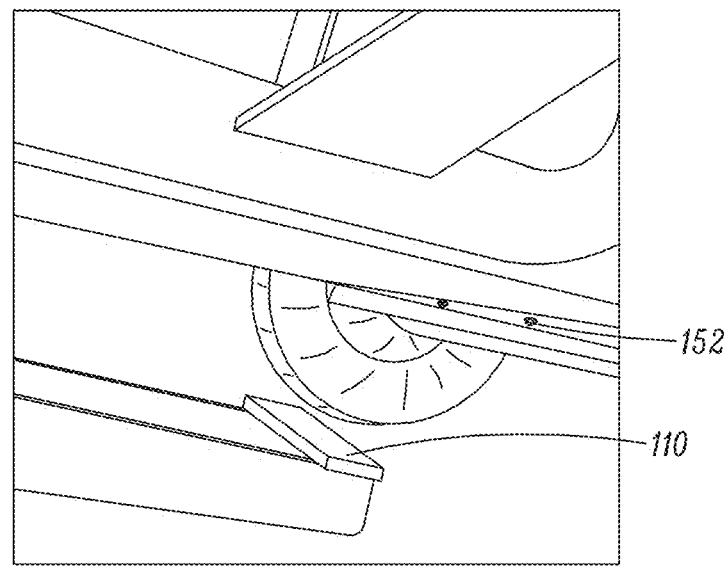
Figure 3D:
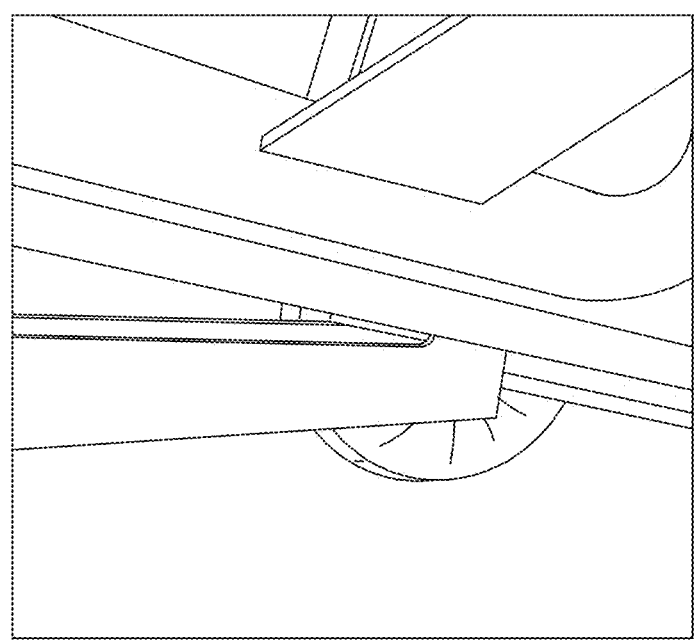

As shown in FIGS. 3C-3D, during this step, as the hook member 118 engages the perimeter 156 of the frame 154, the stop 110 is rotated to engage an undersurface 152 of the frame 154 of the first vehicle 150.

Figure 3E:
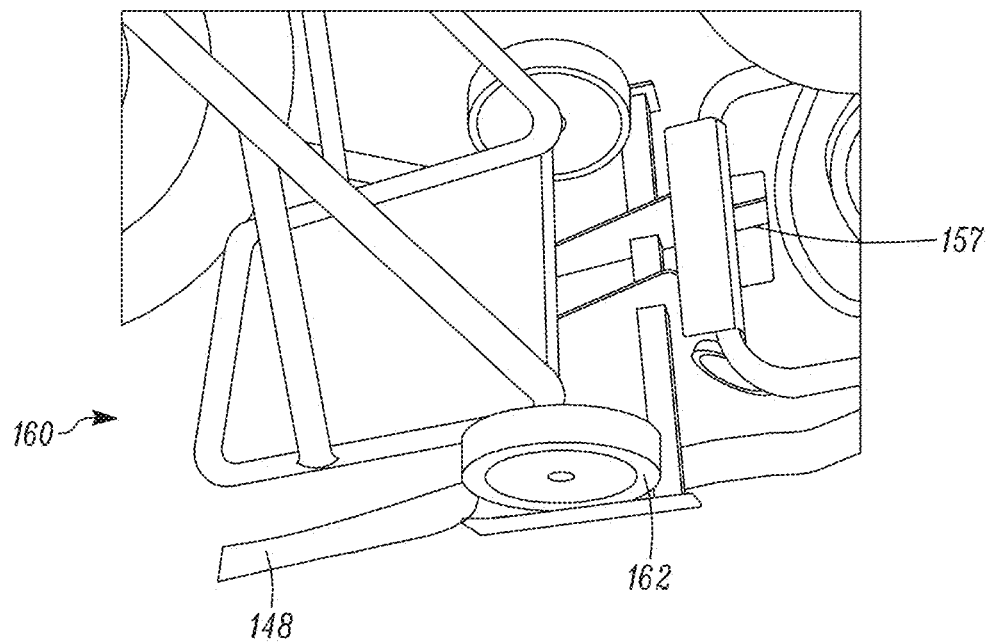
Figure 3F:
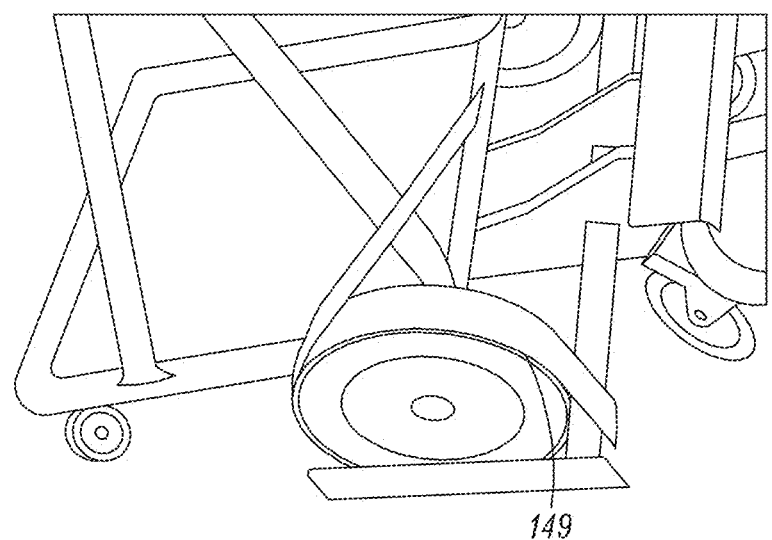
Figure 3G:
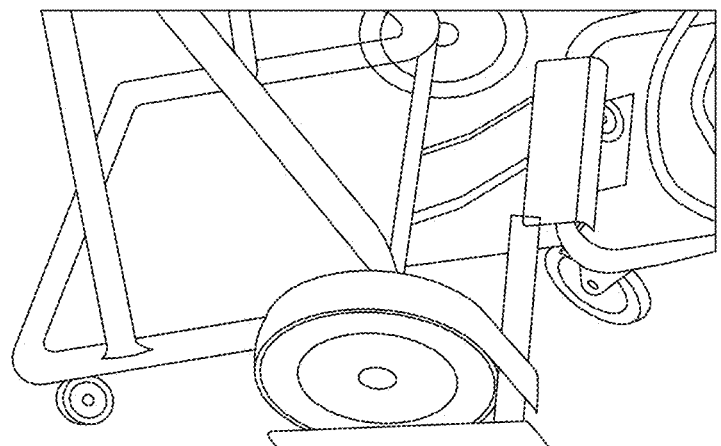

As shown in FIGS. 3E-3G, during this step, wheels 162 of the second vehicle 160 are positioned in the spaced apart openings 112a, 112b. In some embodiments, one or more straps 148 are secured to the second area 108 at each opening 112a, 112b. In an example embodiment, the straps 148 are riveted to the second pair of members 172a, 172b at each opening 112a, 112b. The strap 148 is sized to fit around a circumference of the wheel 162. In some embodiments, the strap 148 includes hook and loop material 149 such as Velcro®, that is used to attach the strap 148 to itself and secure the wheels 162 within the openings 112. This advantageously secures the vehicle 160 within the openings 112 and avoids accidental tilting of the vehicle 160.

Figure 3H:
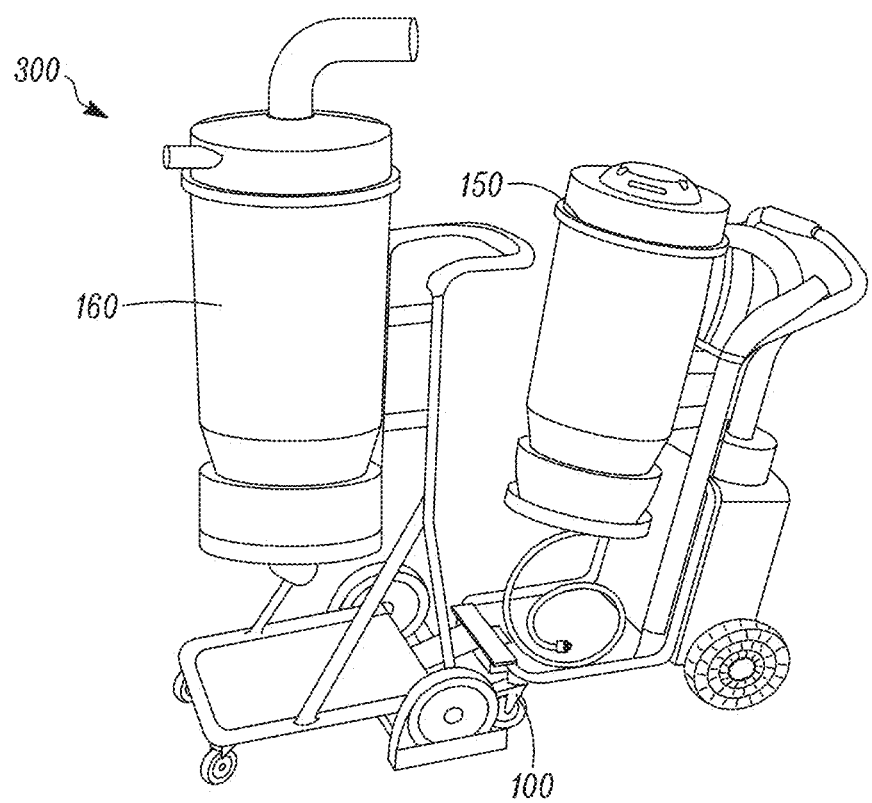

As shown in FIG. 3H, a connected arrangement 300 is depicted of the first vehicle 150, the second vehicle 160 and the apparatus 100 between the first and second vehicle. A worker can then easily move the first and second vehicles 150, 160 together, including easily turning the vehicles and moving them through a doorway. As previously discussed, a minimum clearance 142 (FIG. 2D) is also provided between a base of the wheels 162 and the ground surface 144, to accommodate easy transport.

Figure 4A:
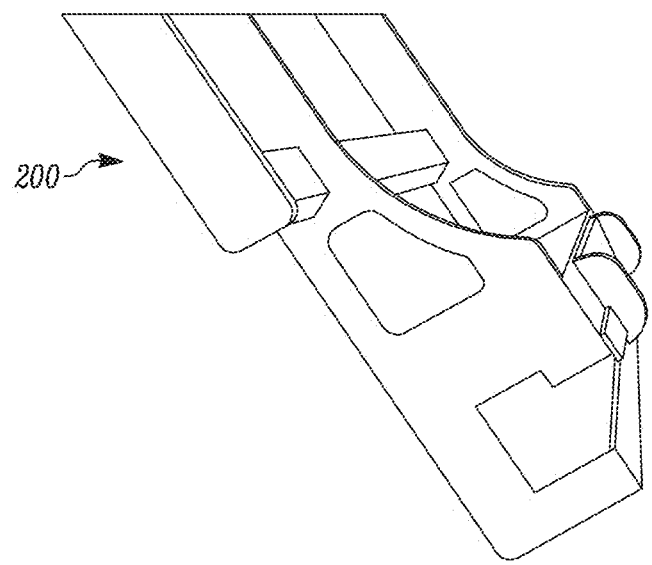
FIGS. 4A-4H are photographs that show various steps of coupling the wheeled vehicles using the apparatus of FIG. 2A, according to one embodiment.
Figure 4B:
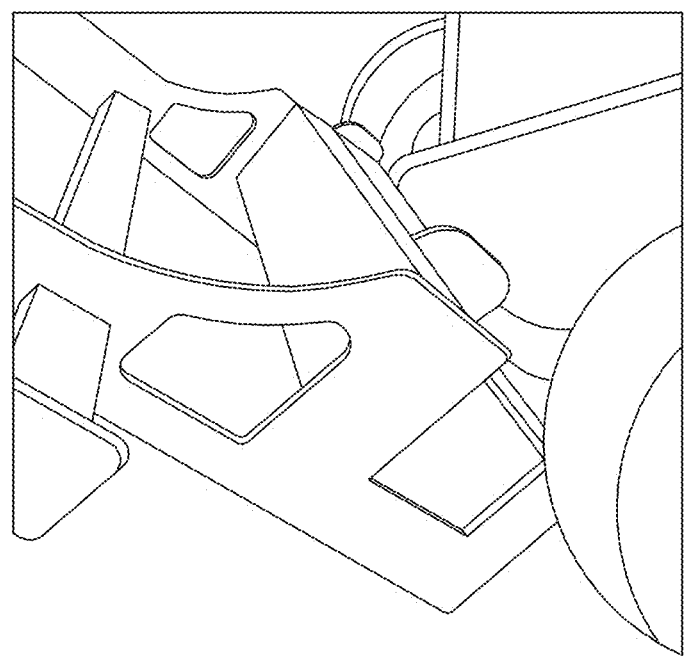
Figure 4C:
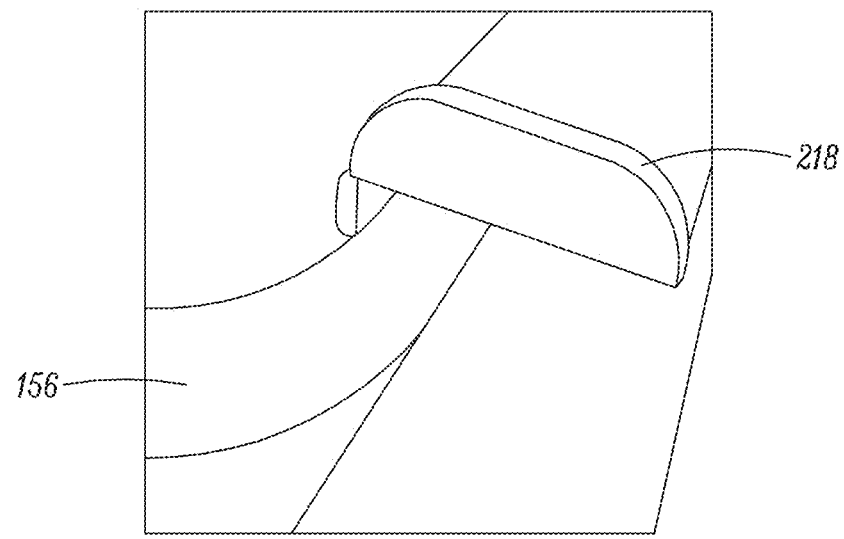

FIGS. 4A-4H are photographs that show various steps of coupling the wheeled vehicles using the apparatus 200 of FIG. 2A, according to one embodiment. As shown in FIG. 4A, in an initial step, the apparatus 200 is oriented at an angle relative to the first vehicle 150. As shown in FIGS. 4B-4C, the hook member 218 is positioned to engage the perimeter 156 of the frame 154 of the first vehicle 150.

Figure 4D:
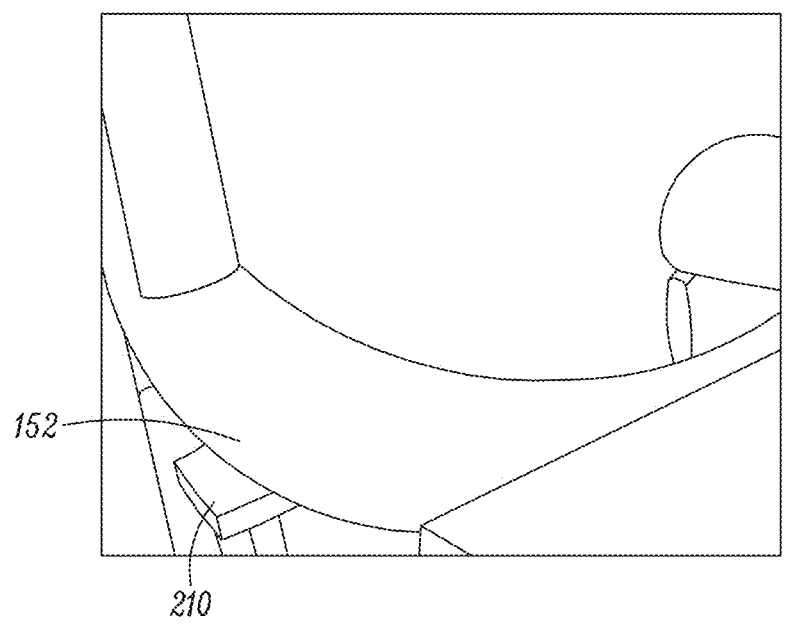
Figure 4E:
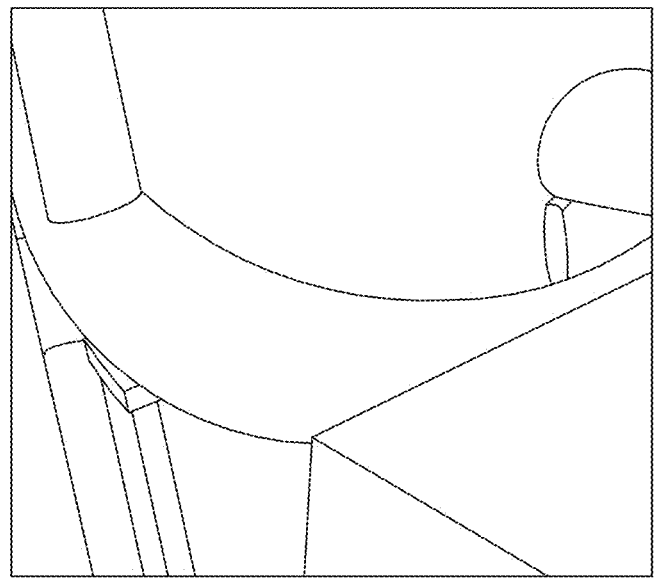

As shown in FIGS. 4D-4E, during this step, as the hook member 218 engages the perimeter 156 of the frame 154, the stop 210 rotates and engages an undersurface 152 of the frame 154 of the first vehicle 150.

Figure 4F:
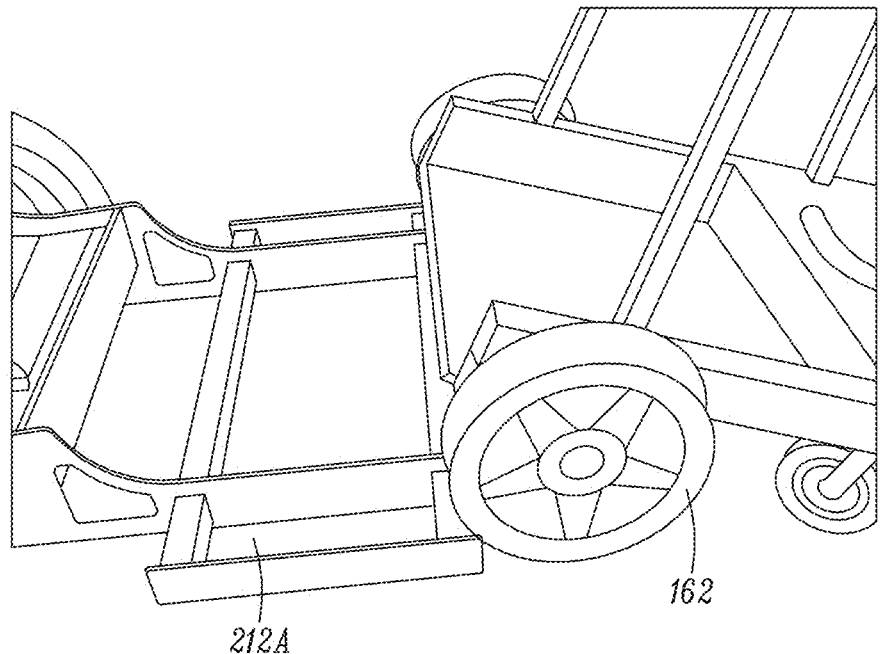
Figure 4G:
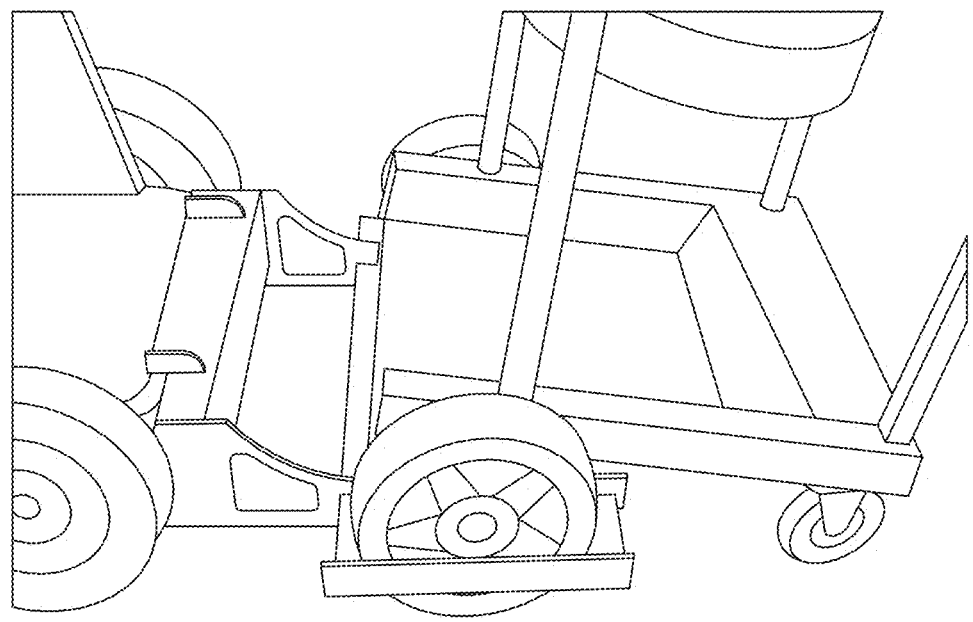

As shown in FIGS. 4F-4G, during this step, the wheels 162 of the second vehicle 160 are positioned in the spaced apart openings 212a, 212b. As shown in FIG. 4F, in an initial step, the second vehicle 160 is tilted so that the wheels 162 are raised off the ground and moved into the openings 212a, 212b. As shown in FIG. 4G, the wheels 162 are moved forward until they slide down into the openings 212a, 212b, which secures the second vehicle 160 to the apparatus 200.

Figure 4H:
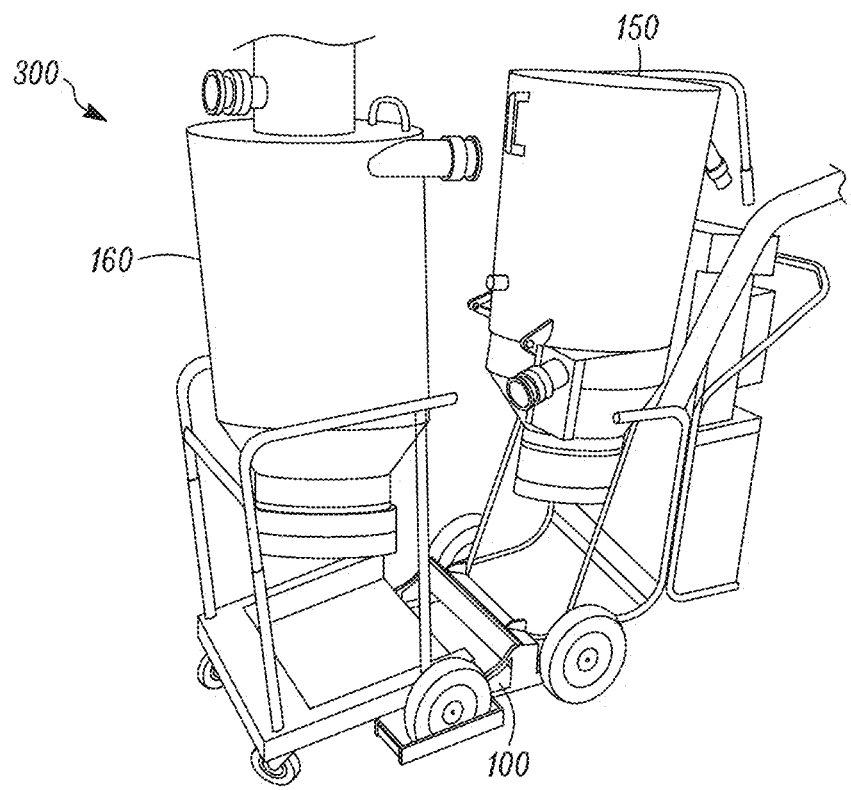

As shown in FIG. 4H, a connected arrangement 300 is depicted of the first vehicle 150, the second vehicle 160 and the apparatus 200 between the first and second vehicle. A worker can then easily move the first and second vehicles 150, 160 together. It should be noted that the apparatus 200 is used to couple two larger sized vehicles 150, 160 than the apparatus 100 which is used to couple two smaller sized vehicles 160, 160 together.

Figure 5:
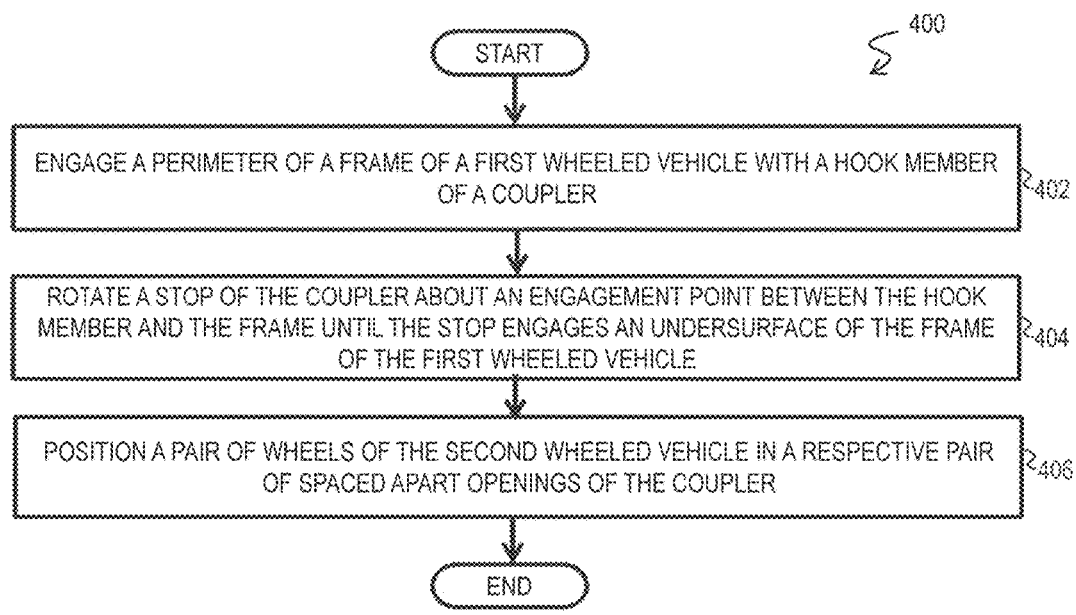
FIG. 5 is a flow diagram that illustrates an example of a method for coupling a first wheeled vehicle to a second wheeled vehicle, according to an embodiment.

FIG. 5 is a flow diagram that illustrates an example of a method 400 for coupling a first wheeled vehicle 150 to a second wheeled vehicle 160, according to an embodiment. In step 402, the perimeter 156 of the frame 154 of the first wheeled vehicle 150 is engaged with the hook member 118, 218 of a coupler 100, 200. In step 404, the stop 110, 210 of the coupler 100, 200 is rotated about an engagement point between the hook member 118, 218 and the frame 154 until the stop 110, 210 engages the undersurface 152 of the frame 154. In step 406, the pair of wheels 162 of the second wheeled vehicle 160 are positioned in a respective pair of spaced apart openings 112, 212 of the coupler 100, 200.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense. Throughout this specification and the claims, unless the context requires otherwise, the word "comprise" and its variations, such as "comprises" and "comprising," will be understood to imply the inclusion of a stated item, element or step or group of items, elements or steps but not the exclusion of any other item, element or step or group of items, elements or steps. Furthermore, the indefinite article "a" or "an" is meant to indicate one or more of the item, element or step modified by the article. As used herein, unless otherwise clear from the context, a value is "about" another value if it is within a factor of two (twice or half) of the other value. While example ranges are given, unless otherwise clear from the context, any contained ranges are also intended in various embodiments. Thus, a range from 0 to 10 includes the range 1 to 4 in some embodiments.

What is claimed:

1. An apparatus for coupling a vacuum to a pre-separator, comprising:
    a first area including a stop configured to engage an undersurface of a frame of the vacuum;
    a second area including a pair of spaced apart openings, said pair of spaced apart openings having a separation and a dimension sized to receive a pair of wheels of the pre-separator;
    a hook member positioned between the first area and the second area, said hook member including a plurality of surfaces configured to engage a perimeter of the frame of the vacuum;
    a first pair of members that are spaced apart and parallel to each other, said first pair of members extending from the first area to the second area; and
    a second pair of members that are spaced apart and parallel to each other, wherein the second pair of members are oriented approximately orthogonal to the first pair of members;
    wherein the stop connects the first pair of members to each other at one end of the first pair of members in the first area.

2. The apparatus of claim 1, wherein the hook member is an L-shaped member including two surfaces that are orthogonal to each other.

3. The apparatus of claim 2, wherein the stop is a flat surface that is oriented parallel to at least one of the two surfaces of the L-shaped member.

4. The apparatus of claim 1, wherein a length of the stop is less than a length of the hook member and wherein the length of the stop is less than a separation between the stop and the hook member such that the stop is sized to fit between wheels of the vacuum positioned on an inside of the vacuum frame.

5. The apparatus of claim 4, wherein the hook member includes an extension having a predetermined length and wherein the perimeter of the frame of the vacuum includes a recess having the predetermined length such that the extension is sized to fit within the recess.

6. The apparatus of claim 1, wherein the second area includes an intermediate opening positioned between the spaced apart openings and wherein a length of the stop is based on a width of the intermediate opening.

7. The apparatus of claim 6, wherein the length of the stop is approximately equal to the width of the intermediate opening.

8. The apparatus of claim 1, wherein the dimension of the spaced apart openings is a length in a range of 5-8 inches that is adjusted to provide a minimum clearance in a range of 1-3 inches between a base of the pair of wheels and a ground surface when the pair of wheels are positioned in the spaced apart openings.

9. The apparatus of claim 1, wherein a length of the stop is greater than a length of the hook member and wherein the length of the stop is greater than a separation between the stop and the hook member such that the stop is sized to fit between wheels of the vacuum positioned on an outside of the frame of the vacuum and the hook member is sized to fit between welds along the perimeter of the frame of the vacuum.

10. The apparatus of claim 1 further comprising a transition region from a first height at the hook member to a second height at the pair of spaced apart openings, wherein the transition region is adjusted such that a difference between the first height and the second height is adjusted to provide clearance between the wheels of the pre-separator and a ground surface and avoid tilting of the pre-separator.

11. The apparatus of claim 1 further comprising at least one strap secured to the second area at each opening, wherein said at least one strap is sized to fit around a circumference of each wheel of the pre-separator and wherein the at least one strap includes hook and loop material to secure the strap around the circumference of each wheel.

12. The apparatus of claim 1, further including:
a pair of links that connect the second pair of members to each other at respective ends of the second pair of members in the second area;
wherein the pair of spaced apart openings are defined by the pair of links, the second pair of members and the first pair of members.

13. The apparatus of claim 12, wherein the first pair of members have a maximum height at an intermediate portion between the first area and the second area, and wherein the hook member is mounted to the intermediate portion.

14. An apparatus for coupling a vacuum to a pre-separator, comprising:
a first pair of members that are spaced apart and parallel to each other;
a second pair of members that are spaced apart and parallel to each other, wherein the second pair of members intersect the first pair of members and are oriented approximately orthogonal to the first pair of members;
a stop that connects the first pair of members to each other at one end of the first pair of members;
a pair of links that connect the second pair of members to each other at respective ends of the second pair of members;
a hook member connected to the first pair of members between opposing ends of the first pair of members, wherein the hook member includes a plurality of surfaces configured to engage a perimeter of a frame of the vacuum; and
a pair of spaced apart openings defined by the pair of links, the second pair of members and the first pair of members are sized to receive a pair of wheels of the pre-separator;
wherein the stop is configured to engage an undersurface of the frame of the vacuum.

* * * * *